United States Patent [19]

Martin

[11] Patent Number: 4,676,108

[45] Date of Patent: Jun. 30, 1987

[54] MULTILAYER DIAPHRAGM FOR PRESSURE TRANSDUCER

[75] Inventor: Kenneth A. Martin, Windsor, Conn.

[73] Assignee: Combustion Engineering, Inc., Windsor, Conn.

[21] Appl. No.: 763,735

[22] Filed: Aug. 8, 1985

[51] Int. Cl.[4] .......................... G01L 7/08; G01L 9/10
[52] U.S. Cl. ..................................................... 73/722
[58] Field of Search ................ 73/722, 728, 708, 753; 336/30

[56] References Cited

U.S. PATENT DOCUMENTS

| | | | |
|---|---|---|---|
| 2,509,210 | 5/1950 | Clark | 73/722 |
| 2,641,742 | 6/1953 | Wolfe et al. | 73/722 |
| 2,986,715 | 5/1961 | Church et al. | 73/722 |
| 3,623,371 | 11/1971 | Sullien-Davin | 73/722 |
| 3,820,400 | 6/1974 | Rosso | 73/722 |
| 3,946,615 | 3/1976 | Hluchan | 73/722 |
| 4,395,916 | 8/1983 | Martin | 73/722 |

Primary Examiner—Donald O. Woodiel
Attorney, Agent, or Firm—John H. Mulholland

[57] ABSTRACT

A laminar diaphragm (16) for use in a pressure transducer (10) comprised of two or more layers (50, 52, 54). The pressure boundary membrane (50) free of machining defects is supported by one or more support members (52, 54) having a fluid passage therethrough (56, 58). The support members (52, 54) are hermetically sealed around the periphery of fluid passages (56, 58) to the pressure boundary membrane (50) such that when the laminar diaphragm (16) is sealed in the pressure transducer (10) deflection of the pressure boundary membrane (50) within the regions of fluid passage (56, 58) in support members (50, 52) accurately indicates pressure.

1 Claim, 6 Drawing Figures

MULTILAYER DIAPHRAGM FOR PRESSURE TRANSDUCER

BACKGROUND OF THE INVENTION

This invention relates to pressure transducers and in particular to a pressure responsive magnetically permeable diaphragm of laminar construction for use in a pressure transducer.

Diaphragms of nonuniform cross-section have been employed in pressure transducers wherein the outer region comprises a rigid integral support and the thickness of the diaphragm near the center is reduced to produce an area of the diaphragm of reduced cross-section where deflection occurs due to subjecting one or both sides of the diaphragm to changing pressure. The rigid integral support of the thicker region of the diaphragm maintains a fixed diameter for the thinner central region to deflect and accurately indicate pressure during temperature gradients and other operating conditions that cause the clamping pressure blocks that hold the diaphragm to deform away from the rigid integral support portion of the diaphragm, thereby maintaining a fixed deflection diameter for pressure indication under a varying clamping diameter.

Diaphragms of nonuniform cross-section have been designed to meet a variety of criteria resulting in varied profiles of the cross-section of a diaphragm designed to meet specific criteria. In order to compete favorably with the flat diaphragm, diaphragms of nonuniform cross-section have typically been machined from a flat diaphragm. The thicker outer portion remains as an integral support while the thinner central region is machined to have a profile to meet the design criteria of the diaphragm application. The machining process may leave machine markings that affect the accuracy of pressure detection and further lead to premature failure of the diaphragm.

What is needed is a diaphragm of nonuniform cross-section that eliminates the machining process thereby eliminating the machine markings that produce inaccurate pressure and lead to premature failure of a diaphragm and further provides for thinner central deflection region than is attainable from a machined diaphragm.

SUMMARY OF THE INVENTION

The present invention provides a diaphragm of nonuniform cross-section that overcomes the previously mentioned problems associated with prior art diaphragms of nonuniform cross-section. A pressure responsive diaphragm of laminar construction is fabricated of at least two layered members. The first member forms the pressure boundary surface and may be of any size or shape compatible with the pressure and deflection cavities of a pressure transducer. The pressure boundary surface is fabricated from flat stock, free of defects, thereby obviating machining the deflecting portion of the diaphragm. The second layer member, and any additional layer members, provide support to the member forming the pressure boundary surface. The second member is substantially coextensive with the pressure boundary surface of the first member and has a fluid passage therethrough. The second member is hermetically sealed to the first member around the periphery of the fluidic passage. The second member of such a diaphragm of laminar construction provides support to the pressure boundary surface first member in the same manner as the rigid integral support of a machined diaphragm.

In this manner a diaphragm of nonuniform cross-section may be fabricated without machining the thinner central region and thereby obviating the detrimental effects of the machining process and providing for thinner central deflection regions than are economically attainable from a machined diaphragm.

DESCRIPTION OF THE PREFERRED EMBODIMENT

Figure 1:
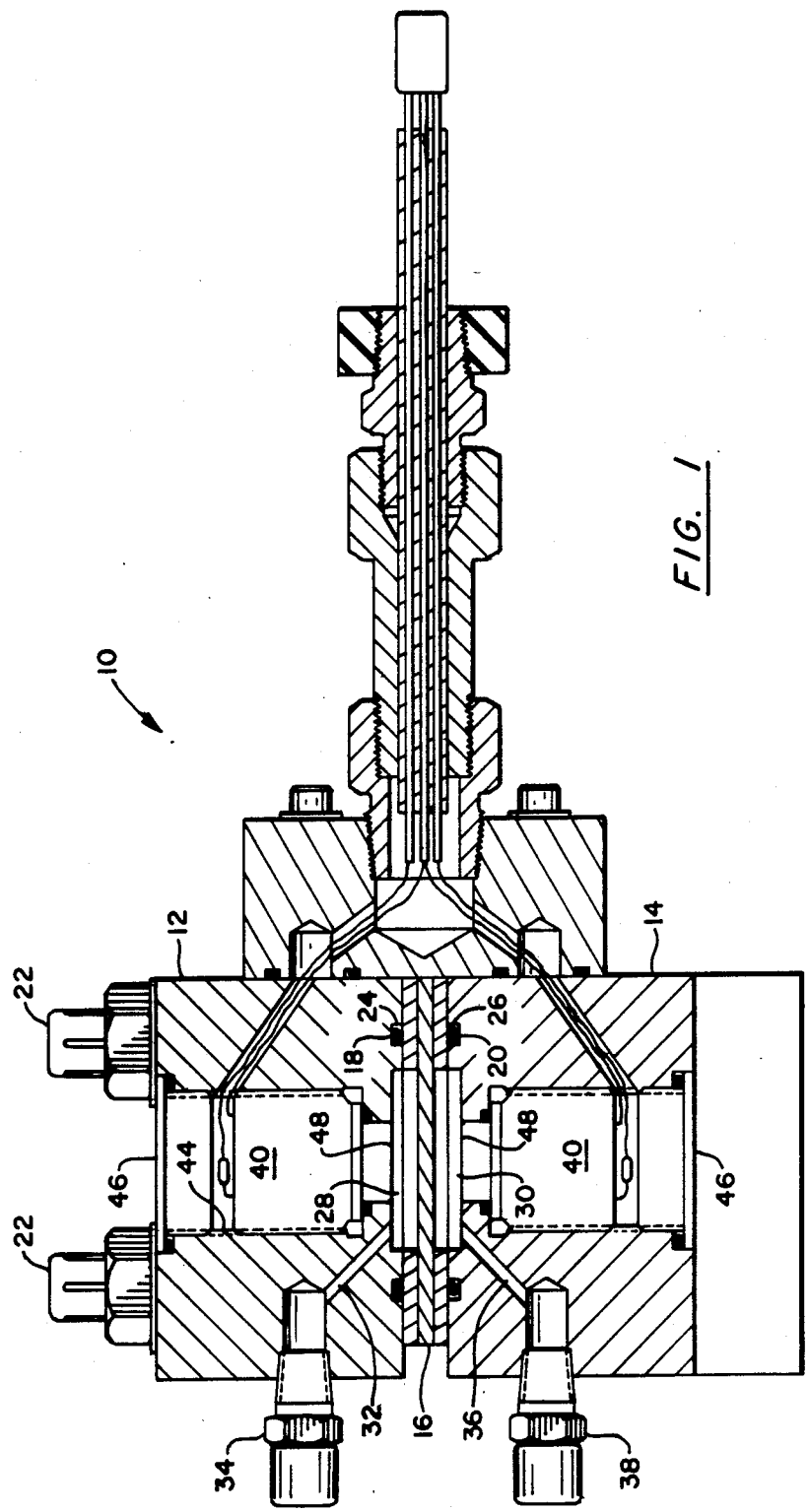
FIG. 1 is a cross-section of a pressure transducer embodying the present invention.

Referring to the drawing, initially to FIG. 1, there is depicted therein a pressure transducer 10 designed in accordance with the present invention. Although the preferred embodiment of the present invention is disclosed in a differential pressure transducer, the invention has application in other pressure transducers such as pressure transducers that would yield a gauge pressure or absolute pressure indication. The housing of pressure transducer 10 is fabricated from magnetically permeable upper pressure block 12 and magnetically permeable lower pressure block 14. Laminar diaphragm 16 is sealed between upper pressure block 12 and lower pressure block 14 by flexible seals 18 and 20, respectively. Through bolts 22 hold laminar diaphragm 16 between upper pressure block 12 and lower pressure block 14. Flexible seal 18 seals between laminar diaphragm 16 and upper pressure block 12 is annular and seats within annular groove 24 in upper pressure block 12. Flexible seal 20 serves a similar function sealing between laminar diaphragm 16 and lower pressure block 14. Flexible seal 20 seats within annular groove 26 in lower pressure block 14.

Laminar diaphragm 16 divides a sealed chamber between upper pressure block 12 and lower pressure block 14 into an upper pressure and deflection cavity 28 within upper pressure block 12 and lower pressure and deflection cavity 30 within lower pressure block 14. Upper pressure and deflection cavity 28 as well as lower pressure and deflection cavity 30 are formed by machining the central portion of upper pressure block 12 and lower pressure block 14 such that when the pressure blocks are brought together a chamber formed of upper pressure and deflection cavity 28 and lower pressure and deflection cavity 30 between the pressure blocks. With magnetically permeable laminar diaphragm 16 secured between pressure blocks 12 and 14, fluid at different pressures may be supplied to either side of laminar diaphragm 16 for determining, for example, differential pressure. The fluid pressure supplied to upper pressure and deflection cavity 28 is supplied through bore hole 32 through upper pressure block 12. Coupling 34 may be mounted on upper pressure block 12 in fluid communication with bore hole 32 and hence upper pressure and deflection cavity 28 to facilitate connecting a pressure line to pressure transducer 10. Similarly, bore hole 36 through lower pressure block 14 is in fluid communication with lower pressure and deflection cavity 30. Coupling 38 may be mounted on lower pressure block 14 in fluid communication with bore hole 36 and hence lower pressure and deflection cavity 30 to facilitate connecting a pressure line to pressure transducer 10.

On either side of laminar diaphragm 16, reactive elements 40 are mounted within the respective pressure blocks 12, 14 in proximity of laminar diaphragm 16 so that magnetic coupling between the reactive elements in the diaphragm can be maintained. As is well known in the art, an alternating current signal is provided to the reactive elements, which are preferably inductance coils. Typically an electric bridge, not shown, for sensing differential changes in reluctance provides the monitoring of differential pressure between upper pressure and deflection cavity 28 and lower pressure and deflection cavity 30 as manifest by deflection of laminar diaphragm 16. Since each reactive element 40 is magnetically coupled to laminar diaphragm 16, any deflection of the diaphragm will produce a differential change in the reluctance of each of the reactive elements. The current signal to reactive elements 40 are conducted through conductors 42 which pass through pressure blocks 12 and 14 for external signal processing. A bore hole 44 extends through upper pressure block 12 to pressure and deflection cavity 28. Reactive element 40 is carried on a mounting plug 46 which in turn carries a nonmagnetic metallic cap 48 which serves to protect reactive element 40 from contact with the fluid within pressure and deflection cavity 28.

Figure 2:
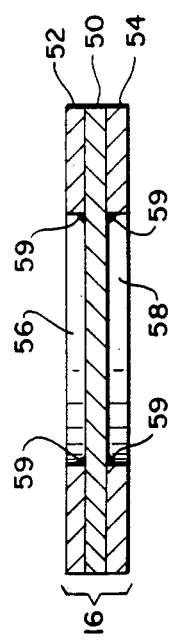
FIG. 2 is an enlarged cross-section of the laminar diaphragm of FIG. 1.
Figure 3:
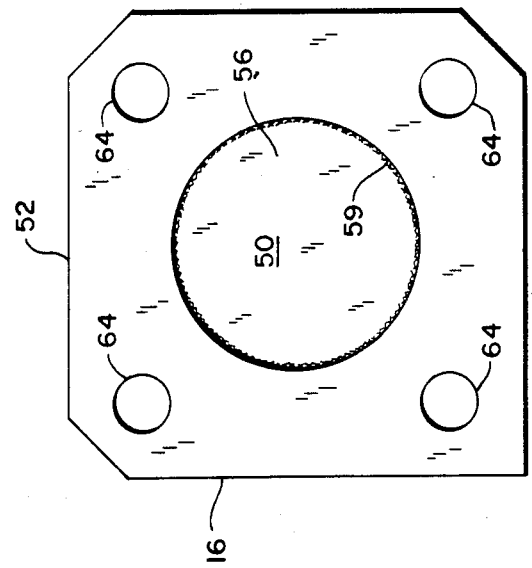
FIG. 3 is a plan view of the enlarged laminar diaphragm of FIG. 2.

In accordance with the present invention, laminar diaphragm 16 is fabricated from at least two layers of the same material, as best seen in FIG. 2. In the preferred embodiment of laminar diaphragm 16, laminar diaphragm 16 is fabricated from a center magnetically permeable first member 50 which forms the pressure boundary surface, a magnetically permeable second member 52, the area of which is substantially coextensive with the pressure boundary surface of first member 50, and a magnetically permeable third member 54, also substantially coextensive with the pressure boundary surface of first member 50. Second member 52 and third member 54 have a fluid passage passing therethrough, respectively 56 and 58. Second member 52 and third member 54 are placed one on each side of first member 50 in sandwich-like fashion as shown by the cross-section in FIG. 2. Second member 54 is hermetically sealed to first member 50 around the periphery of fluid passage 56 such as by electron beam or laser welding. Similarly, third member 54 is hermetically sealed to first member 50 around the periphery of fluid passage 58 such as by electron beam or laser welding.

In the preferred embodiment of the invention, fluid passages 56 and 58 represent a bore through the respective support members 52 and 54. Although fluid passages 56 and 58 are described in the preferred embodiment as a bore, it is within the scope of the invention that these passages may assume any shape.

To maintain the pressure within pressure and deflection cavities 28 and 30, all adjacent support members on each side of the pressure boundary surface must be sealed to each other. Furthermore the support member adjacent the pressure boundary surface must be sealed to the pressure boundary surface. This may be accomplished by welding members 52 and 54 to member 50 such as around the outer perimeter thereof. Welding around the periphery of fluid passages 56 and 58 provides the beneficial effect of drawing center member 52 tight in addition to providing a hermetic seal between the respective members. Furthermore, welding members 52 and 54 to member 50 around the periphery of fluid passages 56 and 58, respectively, provides more support to member 50 than welding members 50, 52 and 54 around the perimeter thereof. Welding around the periphery of the passages 56, 58 is a small fillet weld 59 that forms a small V-shaped gusset around the periphery of the passage forming a hermetic seal. Such a weld 59 draws the center member 52 tight. Second member 52 and third member 54 provide support for first member 50 which forms a pressure boundary surface such that the thicker region of the diaphragm maintains a fixed diameter for the thinner central region to deflect and accurately indicate pressure during temperature gradients that cause the pressure blocks 12 and 14 to deform away from the second and third members, thereby maintaining a fixed deflection diameter for pressure indication under a varying clamping diameter.

The layers of laminar diaphragm 16 are all made of the same material, thereby preventing distortion due to differing thermal expansion characteristics. An acceptable material from which to fabricate a laminar diaphragm is a material that meets standard ASTM A-240 UNS S44635 stainless steel. This alloy is available under the tradename of NU MONIT from Avesta Stainless, Inc.

In a preferred embodiment fluid passage 56 through second member 52 has the same shape and is aligned with fluid passage 58 through third member 54. In yet another preferred embodiment, the thickness of second member 52 is greater than the thickness of first member 50. In yet another preferred embodiment, the thickness of third member 54 is substantially the same as the thickness of second member 52.

The preferred embodiment has been disclosed with reference to a differential pressure transmitter in which reactive elements 40 are mounted on each side of laminar diaphragm 16. The pressure transducer application of the preferred embodiment discloses a laminar diaphragm 16 that is symmetrical about magnetically permeable first member 50 which forms a pressure boundary surface. Some applications of laminar diaphragms do not require a symmetrical laminar diaphragm. In these pressure transducer applications, the laminar diaphragm 16 fabricated of a magnetically permeable first member 50 forming a pressure boundary surface and supported by one or more second members 52 having a fluid passage therethrough such that a cross-section of the resulting laminar diaphragm is nonsymmetrical across first member 50.

Figure 4:
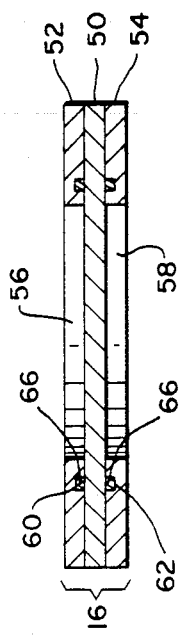
FIG. 4 is an alternate embodiment of an enlarged laminar diaphragm.
Figure 5:
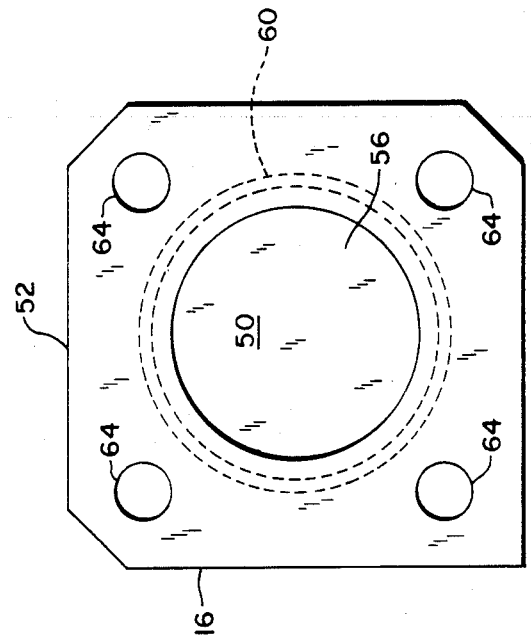
FIG. 5 is a plan view of the enlarged diaphragm of FIG. 4.

An alternate embodiment of the invention is shown in FIGS. 4 and 5. FIG. 4 is a cross-section of laminar diaphragm 16, similar to that shown in FIG. 2, having annular groove 60 in second member 52 circumscribing fluid passage 56 on the surface of second member 52 that is adjacent to first member 50. Similarly, annular groove 62 on the surface of third member 54 adjacent first member 50 circumscribes fluid passage 58. As best seen in FIG. 5, annular grooves 60 and 62 in a preferred embodiment are located between the periphery of fluid passage 56 and bolt holes 64 which accommodate through bolts 22 which in turn secure upper pressure block 12 to lower pressure block 14 with laminar diaphragm 16 sandwiched therebetween.

Annular grooves 60 and 62 accommodate a ring of silver solder 66. The three members 50, 52 and 54 are placed together as shown in FIG. 4, pressed together then by induction solder heated thereby fusing the three members 50, 52 and 54 together forming laminar diaphragm 16.

A large pressure maintained on only one side of a diaphragm forming a pressure boundary surface requires a relatively thick pressure boundary membrane. However, in a static pressure application, such as measuring differential pressure, a large pressure can be maintained on both sides of a pressure boundary membrane with a relatively thin membrane measuring the differential pressure. Such a need arises, for example, in measuring the fluid level in a tank with system pressure applied to both sides of the differential pressure transmitter.

Figure 6:
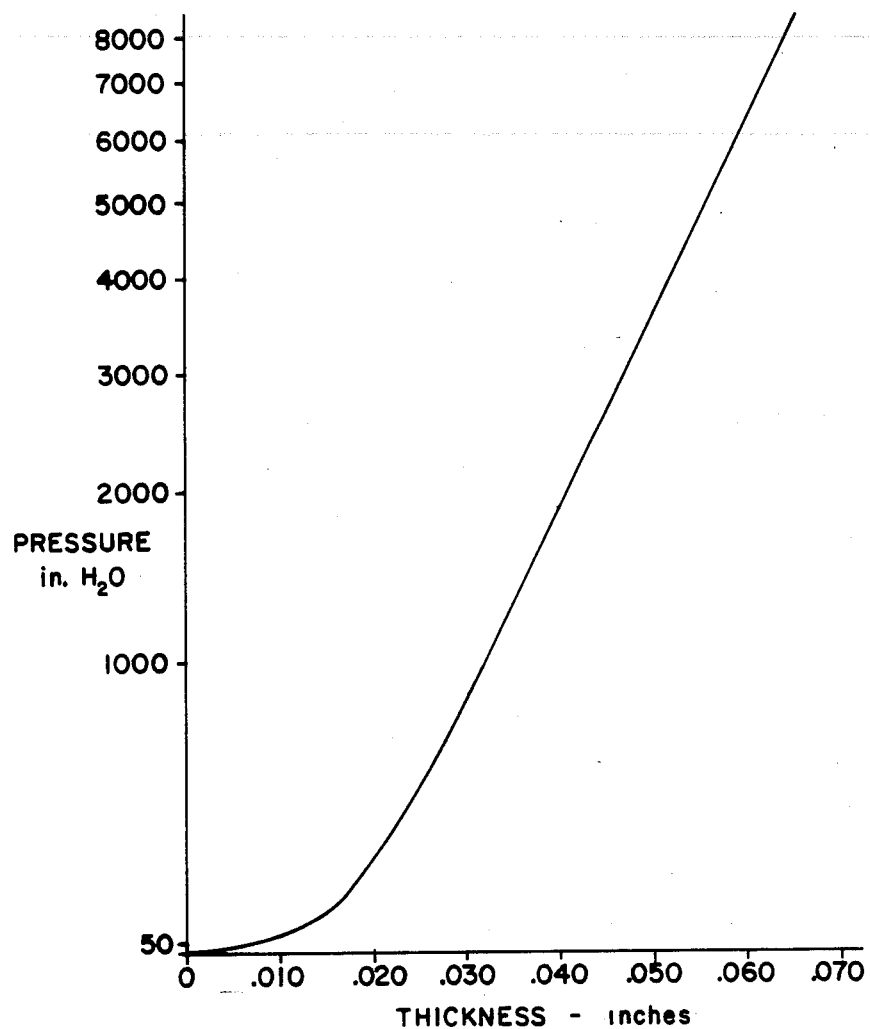
FIG. 6 is a graph showing the relationship between the thickness of the pressure boundary member of the laminar diaphragm as a function of the application static pressure.

The thickness of first member 50 forming the pressure boundary membrane is varied depending upon the application. The thinnest central region of a machined diaphragm that can be practically machined is about 0.10 centimeters (0.040 inches). Fabricating a laminar diaphragm in accordance with Applicant's invention would permit the thickness of the pressure boundary surface, first member 50, to be as thin as 0.013 centimeters (0.005 inches). The curve of FIG. 6 presents the relationship between the thickness of first member 50 and the sensed pressure in a differential pressure transducer application. A thin magnetically permeable pressure boundary membrane must have flexibility such that substantial deflection occurs for low pressure to permit accurate sensing of the pressure change. As the pressure boundary membrane deflects, the air gap decreases between the pressure boundary membrane and a reactive element 40 thereby decreasing the reluctance of the flux path for the reactive element toward which deflection occurred in turn increasing the current through that reactive element. Simultaneously, the air gap increases between the pressure boundary membrane and the other reactive element thereby increasing the reluctance of the flux path of the reactive element away from which deflection occurred which in turn decreases the current through that reactive element. From these changes in current through the two reactive elements, the change in pressure can be determined from precalibration.

The laminar construction of laminar diaphragm 16 provides a means for employing a thin pressure boundary membrane in first member 50 which can provide the required substantial deflection for low pressure applications while concomitantly providing support to the thin pressure boundary membrane without introducing machine markings on the pressure boundary membrane that can produce inaccurate sensed pressure indications or lead to premature failure of the pressure boundary membrane. Furthermore, fabricating a diaphragm using laminar construction provides a means of employing a thinner pressure boundary surface which in the central region of the diaphragm is the deflecting portion of the diaphragm more economically than providing a machined diaphragm of the same thickness in the central region.

I claim:

1. In a pressure transducer, the improvement comprising:
   a first member of unmachined magnetically permeable sheet material having a first thickness and two flat sides;
   a second member of the same material and of greater thickness than said first member secured by fusion to one of said two flat sides;
   a third member of the same material and of greater thickness than said first member secured by fusion means to the other of said thereby two flat sides to define a laminar diaphragm;
   a passage through each said second member and said third member aligned with each other to expose an area on each side of said first member to which they are secured;
   block means of magnetically permeable material in clamping engagement with said second member and said third member on their respective sides remote from said first member to define in combination with said aligned passageways, a first pressure and deflection cavity on one side of said first member and a second pressure and deflection cavity on the opposite side of said first member; and,
   reactive elements mounted in said block means on each side of said first member.

* * * * *

UNITED STATES PATENT AND TRADEMARK OFFICE
CERTIFICATE OF CORRECTION

PATENT NO. : 4,676,108
DATED : June 30, 1987
INVENTOR(S) : Kenneth A. Martin

It is certified that error appears in the above—identified patent and that said Letters Patent is hereby corrected as shown below:

Column 6, line 31 (Claim 1, line 11), "thereby" should appear after "sides"; (it now appears before "two").

Signed and Sealed this

Sixteenth Day of August, 1988

Attest:

DONALD J. QUIGG

Attesting Officer

Commissioner of Patents and Trademarks